(12) United States Patent
Roberts

(10) Patent No.: US 8,721,009 B1
(45) Date of Patent: May 13, 2014

(54) ANTI-SKID BRAKING SYSTEM FOR AN AIRCRAFT

(75) Inventor: Ronald Roberts, Tulsa, OK (US)

(73) Assignee: Advent Aerospace, Inc., Rye, NH (US)

( * ) Notice: Subject to any disclaimer, the term of this patent is extended or adjusted under 35 U.S.C. 154(b) by 109 days.

(21) Appl. No.: 13/151,831

(22) Filed: Jun. 2, 2011

(51) Int. Cl.
*B60T 8/40* (2006.01)

(52) U.S. Cl.
USPC .................. 303/116.1; 303/DIG. 11; 303/157

(58) Field of Classification Search
USPC ........... 303/3, 11, 15, 126, 157, 113.1, 115.1, 303/116.1, 119.1, 87, DIG. 11, 10, 116.3
See application file for complete search history.

(56) References Cited

U.S. PATENT DOCUMENTS

| | | | |
|---|---|---|---|
| 2,788,186 A | | 4/1957 | Wilson |
| 2,944,772 A | | 7/1960 | Armstrong et al. |
| 2,944,773 A | | 7/1960 | Highley |
| 2,957,659 A | | 10/1960 | Yarber |
| 3,724,916 A | | 4/1973 | Hirzel |
| 3,726,568 A | | 4/1973 | Krugler, Jr. |
| 3,881,783 A | | 5/1975 | Shiber |
| 3,937,526 A | | 2/1976 | Ruof |
| 4,113,323 A | | 9/1978 | Haney |
| 4,138,164 A | | 2/1979 | Masclet |
| 4,367,529 A | | 1/1983 | Masclet et al. |
| 4,755,008 A | * | 7/1988 | Imoto et al. ................. 303/113.2 |
| 5,050,940 A | | 9/1991 | Bedford et al. |
| 5,271,667 A | * | 12/1993 | Takata et al. ................ 303/113.2 |
| 5,918,949 A | * | 7/1999 | Volz et al. ................... 303/115.4 |
| 6,820,946 B2 | | 11/2004 | Salamat et al. |
| 7,035,725 B1 | | 4/2006 | Park et al. |
| 2008/0257033 A1 | | 10/2008 | Roberts |
| 2010/0063703 A1 | | 3/2010 | Clothier |
| 2011/0253489 A1 | * | 10/2011 | Ward ............................ 188/156 |

FOREIGN PATENT DOCUMENTS

EP       0045253       2/1982

OTHER PUBLICATIONS

"Behavior of Aircraft Antiskid Braking Systems on Dry and Wet Runway Surfaces," NASA Report, Dec. 1976.

* cited by examiner

*Primary Examiner* — Bradley King
*Assistant Examiner* — Vu Q Nguyen
(74) *Attorney, Agent, or Firm* — Head, Johnson & Kachigian, P.C.

(57) ABSTRACT

An anti-skid braking system for an aircraft having a brake pedal in communication with a master cylinder and fluid reservoir, and a brake caliper engaged with a wheel. The system includes a three way hydraulic valve controlled by a solenoid wherein the hydraulic valve is in fluid communication with and between the master cylinder and fluid reservoir and the brake caliper. A double acting spring loaded accumulator has an accumulator piston wherein the accumulator is in fluid communication with and between the three way hydraulic valve and the brake caliper. A hydraulic pump is in fluid communication with and between the three way hydraulic valve and the brake caliper.

8 Claims, 6 Drawing Sheets

ANTI-SKID BRAKING SYSTEM FOR AN AIRCRAFT

BACKGROUND OF THE INVENTION

1. Field of the Invention

The present invention relates to an anti-skid braking system for an aircraft. In particular, the present invention is directed to an anti-skid or anti-lock braking system for aircraft having a spring loaded, double acting accumulator in series with a master cylinder and a brake cylinder.

2. Prior Art

Large aircraft, such as jet airplanes and turbo prop airplanes, typically have anti-locking braking systems which consist of manipulating the metering spool on a hydraulic boost valve of a power braking system. Smaller aircraft typically do not include power braking systems and do not include anti-skid braking mechanisms. Unlike automobiles and other vehicles, small aircraft typically have independent left side braking systems and independent right side braking systems.

In prior anti-skid braking systems, the wheel speed is monitored to detect a sudden deceleration to initiate the anti-skid braking system.

As various patents in the literature have disclosed, an anti-skid braking system could operate by comparing the wheel speed to the vehicle's speed. This vehicle speed could be derived from a GPS provided signal. No such system is being manufactured for use on a manual aircraft.

For example, Clothier (U.S. Patent Publication No. 2010/0063703) discloses a braking control for aircraft including unmanned vehicles having a first side braking unit for braking a first wheel and a second side braking unit for braking a second wheel. A brake control unit receives independently generated aircraft speed data, such as GPS (global positioning system) data.

Masclet (U.S. Pat. No. 4,367,529) discloses automatically controlling braking of an aircraft wherein function of the true speed of the aircraft is compared with program speed Vp to obtain a different signal.

Hirzel (U.S. Pat. No. 3,724,916) discloses anti-skid braking for aircraft with independently brakable wheels capable of producing signals representative of the changing ground speed and modifying braking action of the individual wheels.

Different types of anti-skid braking systems have also been employed. Krugler, Jr. (U.S. Pat. No. 3,726,568) includes a wheel slip detecting circuit and an hydraulic pressure control piston that pulls fluid from the brake during an anti-skid function. This feature decreases the pressure condition to initiate the anti-skid system.

Some existing anti-lock braking systems require sophisticated digital controllers which require software that is expensive to develop and certify.

There remains a need for a simple and inexpensive anti-skid braking system for aircraft which is operated by an analog electronic circuit.

Accordingly, the present invention is directed to an anti-skid braking system for aircraft providing better directional control and reduced stopping distance on runways and in particular, runways contaminated with debris, water, ice or snow.

The present invention is also directed to an anti-skid braking system for aircraft which reduces flat-spotted and blown tires during aggressive stopping on dry or contaminated runways.

The present invention is also directed to an anti-skid braking system for aircraft providing reduced stopping distance by allowing more aggressive braking on clear and dry runways.

The present invention is also directed to an anti-skid braking system that causes hydraulic fluid to flow to the master cylinder during anti-skid operation, providing direct tactile feedback to the pilot.

The present invention is also directed to an anti-skid braking system having no net fluid volume change in the braking circuit during anti-skid operation due to use of a balanced, double acting accumulator.

SUMMARY OF THE INVENTION

The present invention provides an anti-skid braking system which operates with a master cylinder having a fluid reservoir in communication with a moveable brake pedal. The hydraulic module is also in communication with a brake caliper at one of the wheels through a fluid line.

Upon application of force to the braking pedal, a pump motor charges an accumulator with a volume of fluid, under pressure.

A three way hydraulic valve combined with and controlled by a solenoid controls fluid flow into and through the hydraulic module. A three-way hydraulic valve is thus, in communication with and between the master cylinder and fluid reservoir and the brake caliper.

An analog electronic controller controls the three way hydraulic valve and solenoid and also controls the hydraulic pump. The analog electronic controller also receives information and data from the wheel on the speed of the wheel, as well as the aircraft's ground speed from a GPS receiver.

BRIEF DESCRIPTION OF THE DRAWINGS

FIG. 2 illustrates a conceptual diagram of operation of the braking system in normal operation mode while

FIG. 4 illustrates a detailed sectional view of a hydraulic module of the system during normal breaking mode while

DETAILED DESCRIPTION OF THE PREFERRED EMBODIMENTS

The embodiments discussed herein are merely illustrative of specific manners in which to make and use the invention and are not to be interpreted as limiting the scope of the present invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
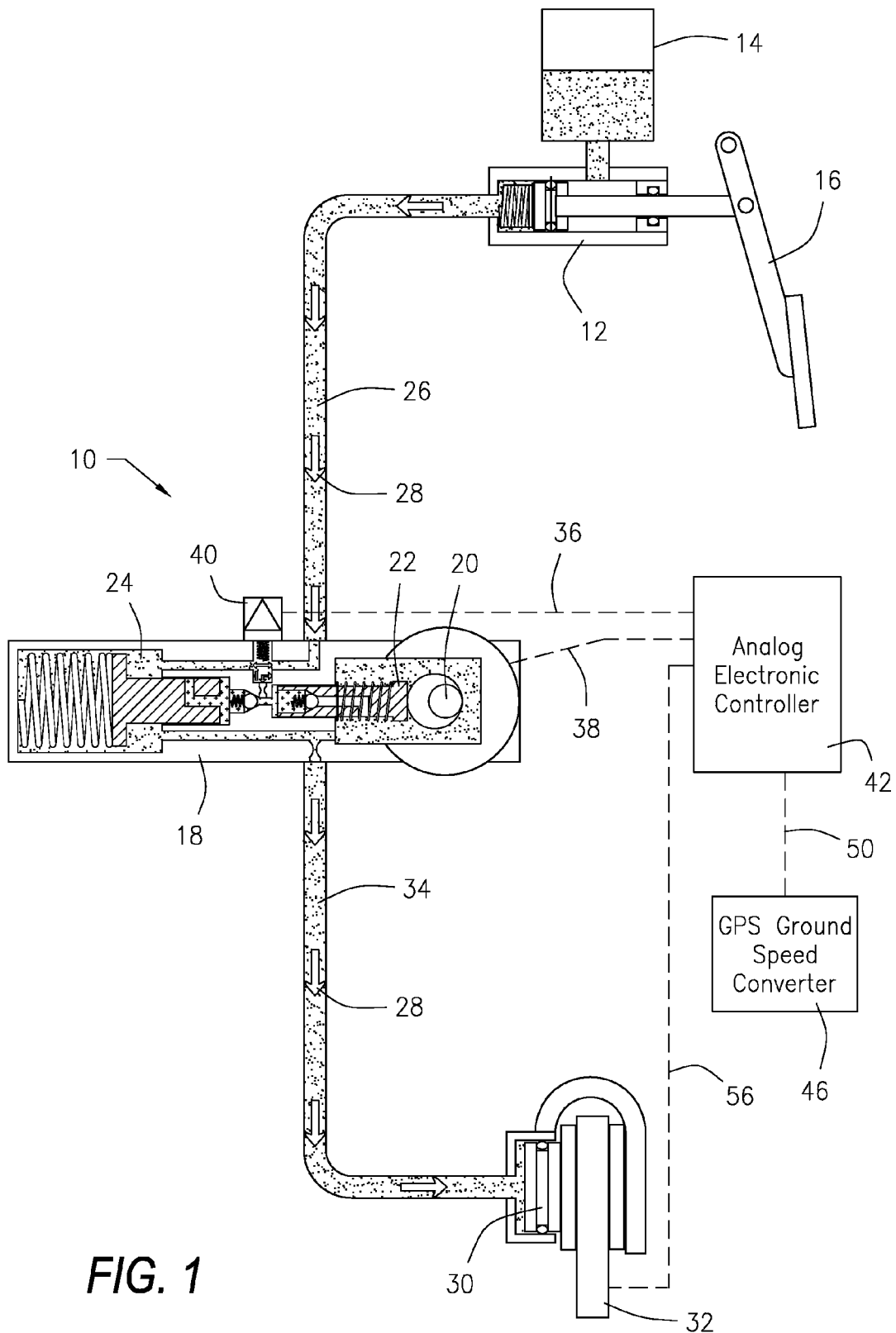
FIG. 1 illustrates a simplified schematic diagram of an anti-skid braking system constructed in accordance with the present invention.

Referring to the drawings in detail, FIG. 1 illustrates a simplified schematic diagram of an anti-skid braking system 10 constructed in accordance with the present invention. Arrows illustrate the flow of fluid therethrough. In certain aircraft, independent braking systems are provided for the left and right wheel. FIG. 1 illustrates a simplified diagram of one of the independent brake systems. A separate braking system (not shown) would also be provided.

A master cylinder 12 operates with a fluid reservoir 14. A moveable brake pedal 16 is engaged with the master cylinder 12 which is accessible by the pilot or pilots.

An hydraulic module 18 (to be described in detail) is in fluid communication with the master cylinder 12 through a fluid line 26. Arrows 28 illustrates the direction of fluid flow through the fluid line 26 during normal braking operations.

In order to engage the braking system, the brake pedal 16 is depressed. Upon application of force to the braking pedal 16, a pump motor (not shown) having a shaft 20 and an eccentric rotating cam will reciprocate a pump piston 22 which charges an accumulator 24 (to be described in detail).

The hydraulic module 18, in turn, is in fluid communication with a brake caliper 30 at one of the wheels 32 through a fluid line 34. Arrows 28 illustrate the direction of fluid flow through the fluid line 34 during normal braking operations.

A three way hydraulic valve combined with and controlled by a solenoid 40 (illustrated diagrammatically by a triangle) controls fluid flow into and through the hydraulic module 18. The hydraulic valve 40 is, thus, in fluid communication with and between the master cylinder 12 and fluid reservoir 14 and the brake caliper 30.

In one non-limiting example, upon depression of the brake pedal 16, the accumulator 24 will be charged with 1600 psi (pounds per square inch) of hydraulic fluid pressure. This will be accomplished in approximately 0.1 second.

The three way valve and solenoid 40 are in communication with an analog electronic controller, shown diagrammatically as box 42, through dashed line 36.

The analog electronic controller 42 controls the three way hydraulic valve and solenoid 40 and also controls the hydraulic pump and shaft 20 and 22 as illustrated by dashed line 38. The analog electronic controller 42 receives information and data from the wheel 32, as shown by dashed line 56. Specifically, the analog electronic controller 42 receives the information on the speed of the wheel 32.

The analog electronic controller 42 also receives information and data regarding the ground speed of the aircraft (not shown). In a preferred embodiment, the ground speed of the aircraft is provided by a GPS (global positioning satellite) source 46, connection to the controller as shown by dashed line 50.

Figure 2:
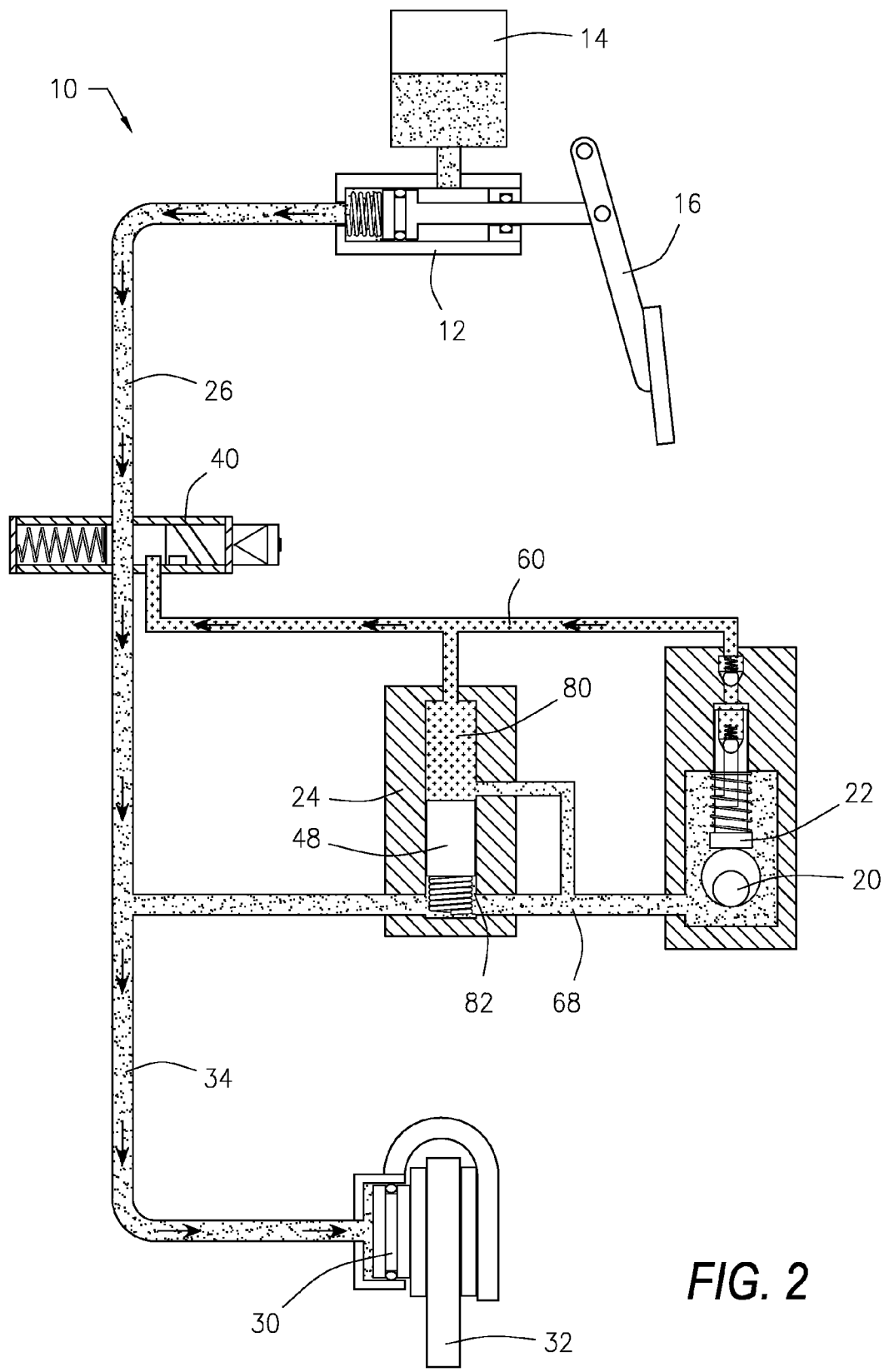
Figure 3:
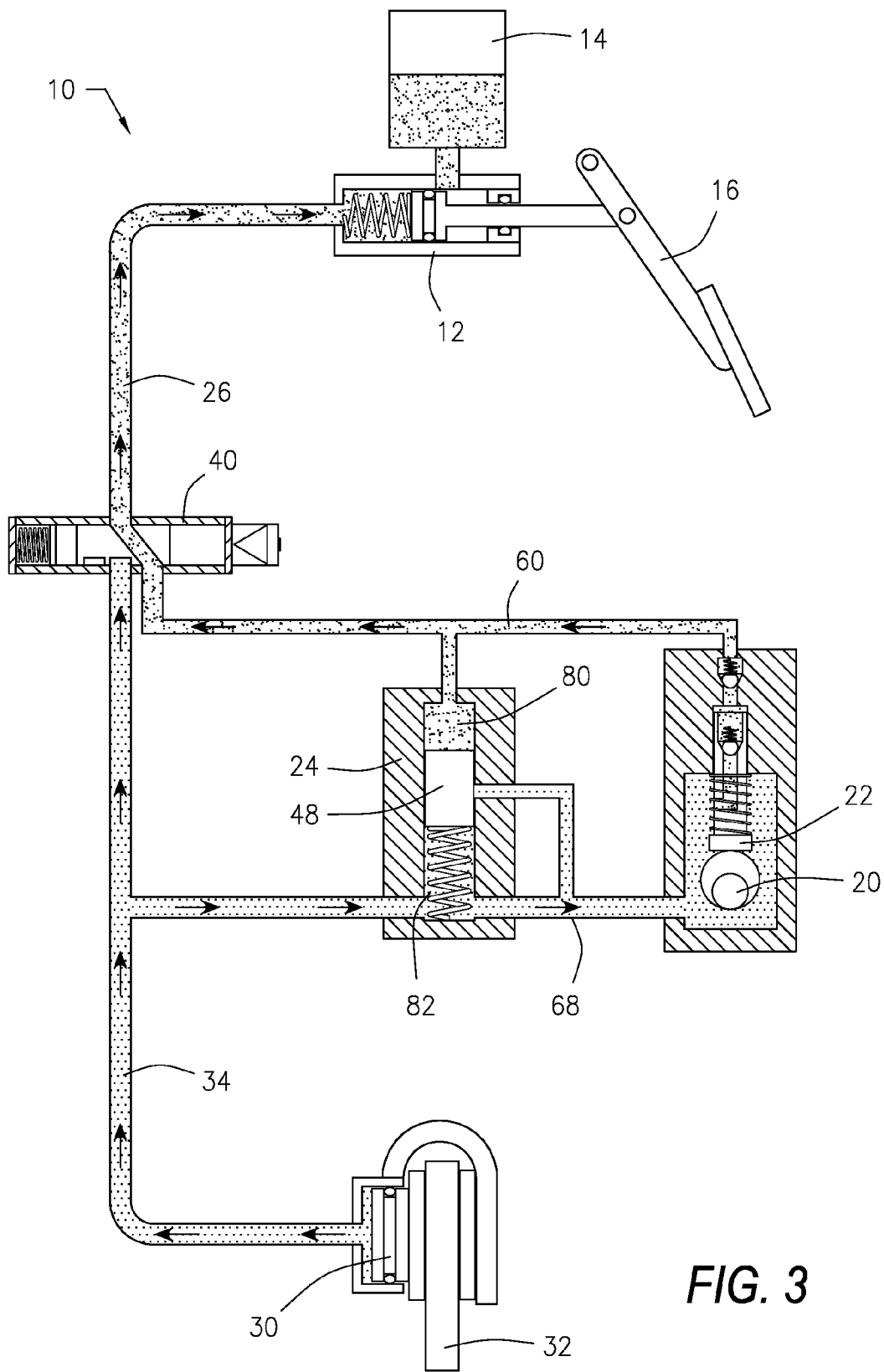
FIG. 3 illustrates operation of the braking system when encountering anti-skid conditions.

FIGS. 2 and 3 illustrates simplified conceptual diagrams of the anti-skid braking system 10, rather than structural drawings. FIG. 2 illustrates operation of the braking system 10 in normal operation mode wherein brake pressure is caused and regulated by force on the brake pedal 16.

FIG. 3 illustrates a conceptual diagram of operation of the braking system 10 when encountering anti-skid conditions.

In FIGS. 2 and 3, the three way hydraulic valve and solenoid 40 are shown separated from the accumulator 24 for ease of comprehension. Likewise, the pump piston 22 and shaft 20 are shown separated from the accumulator 24 and from the three way hydraulic valve 40.

During normal braking operation as shown in FIG. 2, the pump piston 22 provides fluid force which is directed through the fluid line 34 which is directed to the brake caliper. The braking pressure is caused by and regulated by action on the pedal 16. The action of the pump maintains a high pressure in line 60.

During anti-skid braking operation as shown in FIG. 3, braking pressure continues to be caused by and regulated by force on the pedal, however, other forces are also involved. The three way hydraulic valve and solenoid 40 are switched to permit the high pressure line 60 to supply fluid force through the three way valve 40 to the fluid line 26 and back to the brake pedal 16. Additionally, fluid through the fluid line 34 from the brake caliper 30 will not be permitted through the three way hydraulic valve 40. The fluid force will cause a piston 48 in the accumulator 24 to be displaced causing fluid to be pumped back through the three way valve 40 to the brake pedal. The displaced piston 48 in the accumulator will cause fluid to flow into a low pressure chamber 82 of the accumulator 24 and thereby reduce braking pressure. Accordingly, the pressure condition is quickly reduced so the brake pressure is dumped. Fluid thus surges from the brake cylinder back toward the master cylinder 12. This rapid flow causes reduced braking pressure which also allows the wheel to gain speed.

Figure 4:
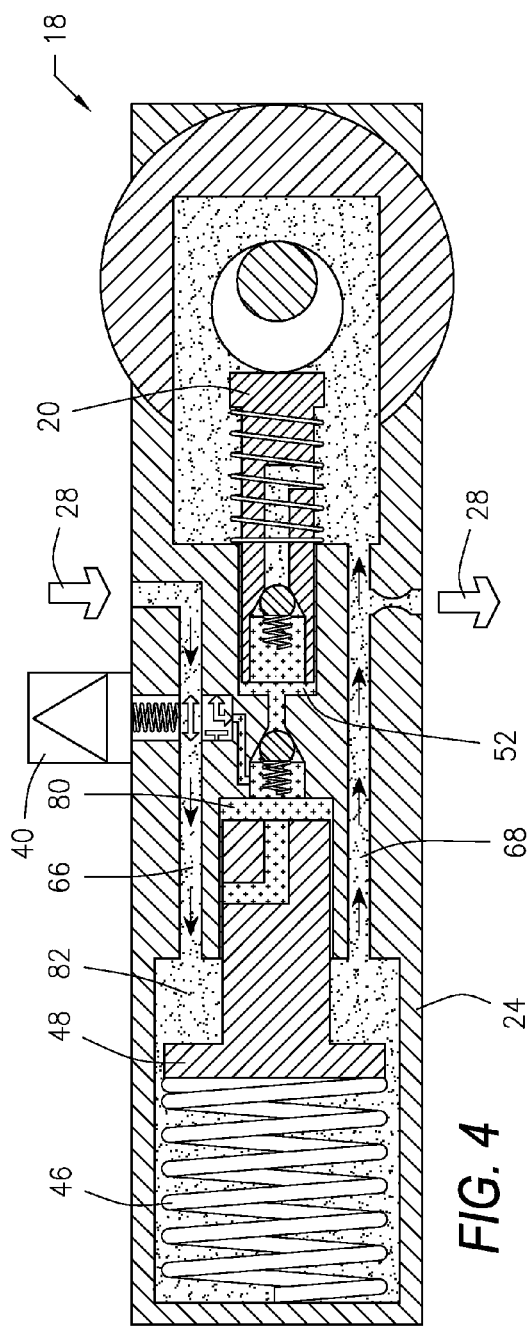
Figure 5:
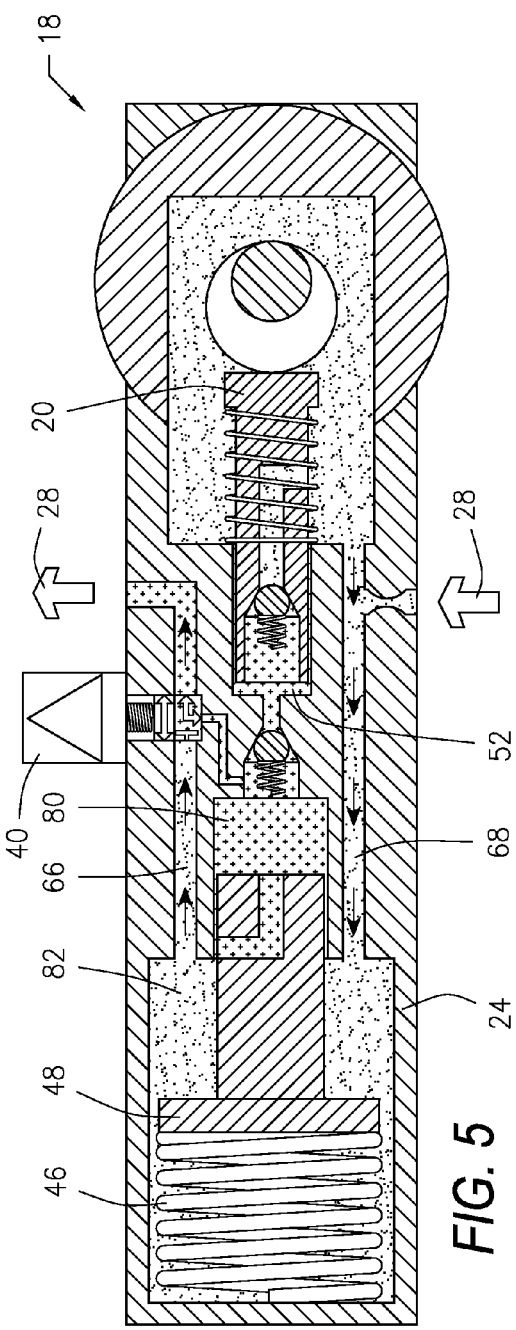
FIG. 5 illustrates the breaking module during anti-skid breaking operation.

FIG. 4 illustrates a detailed view of the hydraulic module 18 as utilized in the normal braking mode shown in FIG. 2. FIG. 5 illustrates the hydraulic module 18 when used during anti-skid braking operation as shown in FIG. 3. Arrows 28 illustrate the direction of fluid flow through the system 10.

As seen in FIG. 4, fluid passing through the system 10 from the master cylinder 12 travels through a passageway 66 in the module 18 past the three way hydraulic valve and solenoid 40. Fluid is directed to an accumulator 24 having a spring 46 which operates in conjunction with an accumulator piston 48. A high pressure fluid circuit 52 is in communication with a high pressure chamber 80 of the accumulator 24 and the pump chamber. The high pressure circuit is separated from the fluid flow during normal braking.

Fluid also travels from the accumulator 24 through a passage 68 in the module 18. The passage 68 is in communication with the pump chamber which includes the piston pump 22 surrounded by a spring. The passage 68 is also in fluid communication with the pump chamber and the outgoing fluid line 34 as shown by arrow 28.

During anti-skid braking operation, the fluid flow is reversed as shown in FIG. 5 by arrows 28. Action of the piston pump 22 causes reverse fluid flow through the passage 68 into the accumulator chamber 24. Fluid from the pump chamber travels past the three way hydraulic valve and solenoid 40 and out of the hydraulic module 18 through fluid line 26 and back toward the master cylinder 12.

In one preferred embodiment, when the speed of the wheel 32 is less than eighty-five percent (85%) of the aircraft's ground speed, a signal is transmitted from the analog electronic controller 42 to the valve and solenoid. The fluid flow surge back through the system is extremely rapid and causes the brake pressure, at the wheel 32, to be reduced while substantially maintaining pressure at the master cylinder 12 which is caused by the depression of the brake pedal. The reduced brake pressure at the wheel 32 causes the wheel to gain speed. Once the wheel speed exceeds eighty-five percent (85%) of the ground speed, the hydraulic valve and solenoid 40 will be closed and the returned back to the normal braking position.

Figure 6:
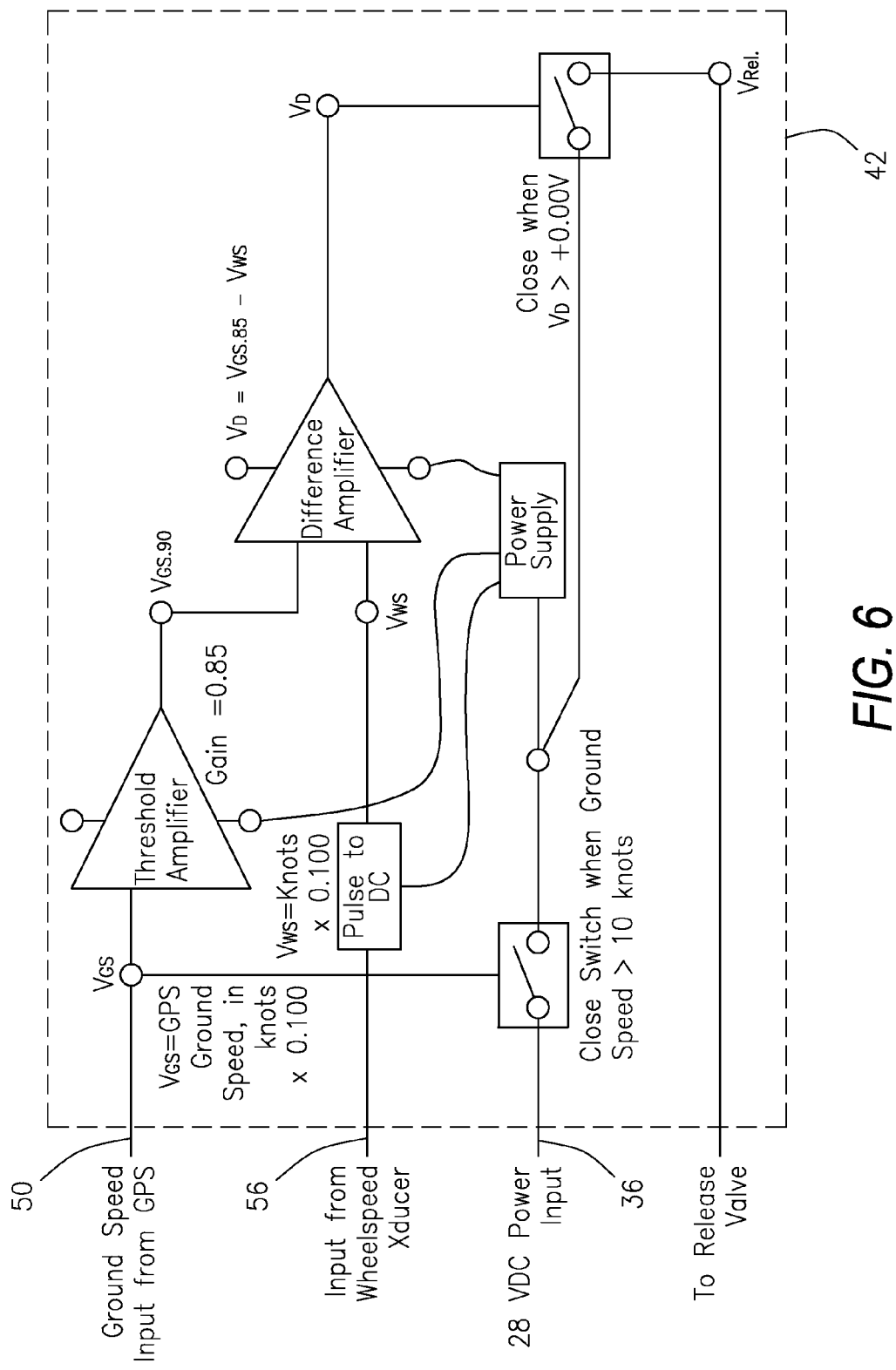
FIG. 6 illustrates a simplified functional diagram of operation of an analog electronic controller used as a part of the anti-skid braking system.

FIG. 6 shows a simplified functional diagram of the operation of the analog electronic controller 42. Input is obtained on the ground speed from the GPS source. Additionally speed input is obtained from the wheel 32. The difference is calculated as shown at the difference amplifier. When the wheel speed is less than eight-five percent (85%) of the ground speed, a signal is transmitted to the valve and solenoid 40.

A wide variety of dynamics are at work including runway friction, valve lag, brake hose elasticity and hydraulic flow restriction. In one non-limiting example, the anti-skid system will cycle from ten (10) to fifty (50) times per second.

Figure 7:
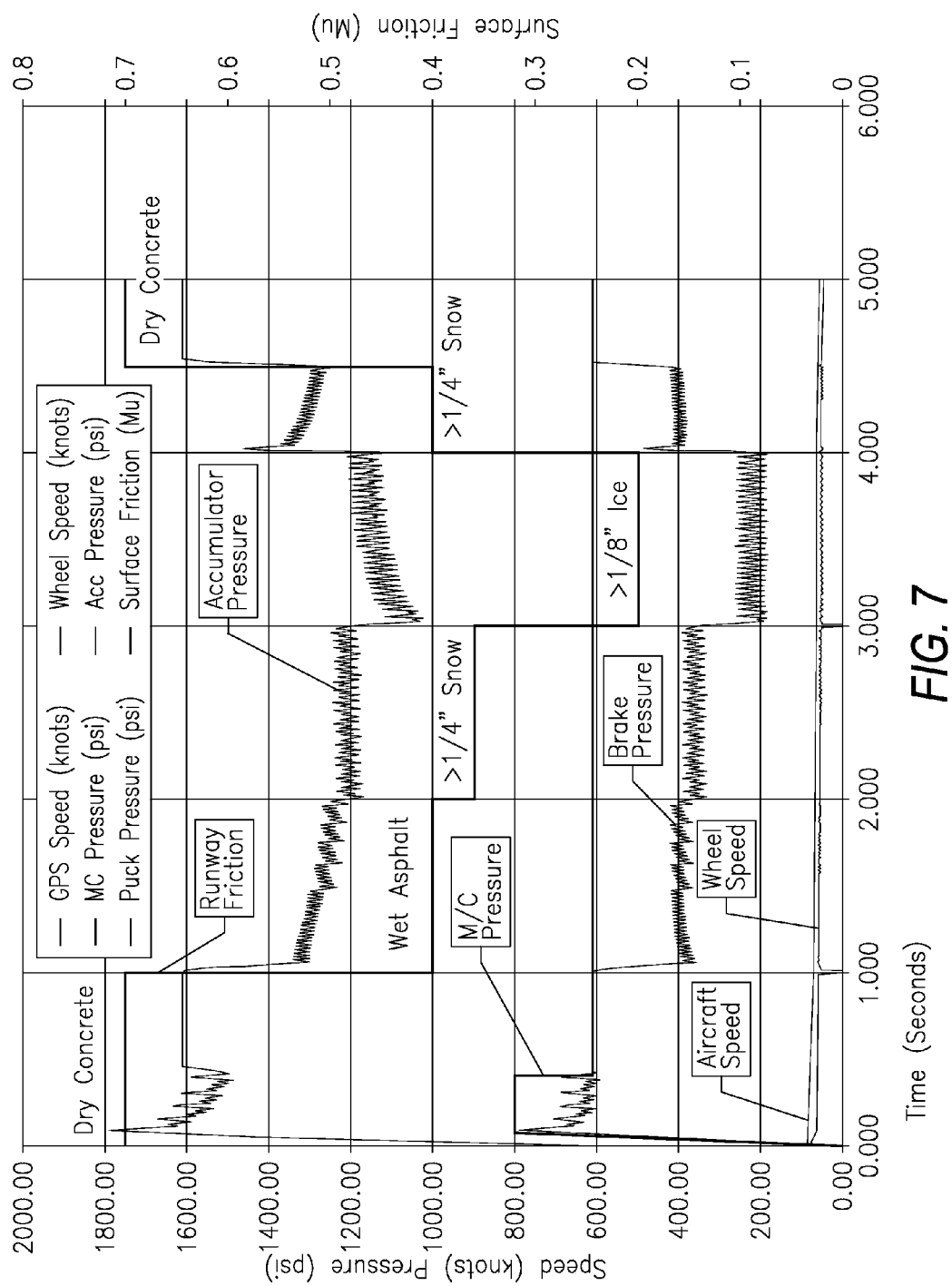
FIG. 7 illustrates a graph showing behavior of the anti-skid braking system during changing runway conditions.

FIG. 7 illustrates a chart showing typical behavior of the anti-lock braking system 10 in response to different runway conditions and friction at different time perimeters. The different runway conditions are described on the chart.

Whereas, the present invention has been described in relation to the drawings attached hereto, it should be understood that other and further modifications, apart from those shown or suggested herein, may be made within the spirit and scope of this invention.

What is claimed is:

1. An anti-skid braking system for aircraft having a brake pedal in communication with a master cylinder and a single fluid reservoir, and a brake caliper engaged with a wheel, which system comprises:
    a three-port two position hydraulic valve controlled by a solenoid, wherein said hydraulic valve is in fluid communication with and between said master cylinder and said brake caliper and wherein said three-port two position hydraulic valve controls fluid flow between said master cylinder and said brake caliper;
    a spring loaded accumulator having an accumulator piston, said accumulator in fluid communication with and between said hydraulic valve and said brake caliper, wherein said accumulator is volume balanced such that movement of the piston pushes fluid to the master cylinder and pulls equal volumes of fluid from the brake caliper;
    a hydraulic pump in fluid communication with and between said hydraulic valve and said brake caliper; and
    a controller to control said hydraulic valve solenoid and to sense rotational speed of said wheel and ground speed of said aircraft.

2. An anti-skid braking system as set forth in claim 1 including means to displace said accumulator piston in said accumulator to cause fluid to flow from said brake caliper through said hydraulic valve to said master cylinder.

3. An anti-skid braking system as set forth in claim 1 wherein said spring loaded accumulator and said hydraulic pump are integrated into a hydraulic module.

4. An anti-skid braking system as set forth in claim 1 wherein said controller is an electronic controller which controls said hydraulic valve solenoid and controls said hydraulic pump and wherein said electronic controller receives information of said rotational speed from said wheel.

5. An anti-skid braking system as set forth in claim 4 including an aircraft ground speed source communicated to said electronic controller.

6. An anti-skid braking system as set forth in claim 5 wherein said aircraft ground speed source includes information from a global positioning satellite system.

7. An anti-skid braking system as set forth in claim 6 wherein a signal is transmitted from said electronic controller to said hydraulic valve solenoid to permit fluid flow from said spring loaded accumulator back to said master cylinder.

8. A method of controlling braking in an aircraft having a brake pedal in communication with a master cylinder and a single fluid reservoir, and a brake caliper engaged with a wheel, which method comprises:
    reciprocating a pump piston in a hydraulic module upon application of force to said brake pedal;
    charging a high pressure chamber of an accumulator in said hydraulic module having a spring loaded accumulator piston with fluid from a low pressure chamber of said accumulator, wherein said accumulator is volume balanced such that movement of the piston pushes fluid to the master cylinder and pulls equal volumes of fluid from the brake caliper;
    providing a fluid path to permit fluid force from said hydraulic module to said brake caliper;
    monitoring speed of said wheel and providing said wheel speed to an electronic controller;
    monitoring ground speed of said aircraft and providing said aircraft ground speed to said electronic controller;
    transmitting a signal from said electronic controller to a three-port two position hydraulic valve solenoid when said wheel speed is a predetermined percentage less than said aircraft ground speed;
    causing movement of said accumulator piston to pull a volume of fluid from said brake caliper to control braking.

* * * * *